Patented Dec. 21, 1948

2,456,991

UNITED STATES PATENT OFFICE 2,456,991

3,4-METHYLENEDIOXYPHENYL-PROPYLENE COMPOUND

Edward A. Prill, Yonkers, N. Y., assignor to Boyce Thompson Institute for Plant Research, Inc., a corporation of New York No Drawing. Application January 16, 1946, Serial No. 641,631

4 Claims. (Cl. 260—338)

This invention relates to organic chemical compounds and has for its object the provision of certain new organic compounds and insecticidal compositions comprising the compounds. I have discovered a series of organic compounds which I have synthesized and found to be markedly active as insecticides. The compounds of the invention are effective insecticides alone and also increase the effectiveness of other insecticides. The compounds of the invention compare favorably with or exceed the extracts of pyrethrin and rotenone bearing plants in toxicity to insects. In admixtures with pyrethrin, the compounds manifest pronounced synergistic effects.

One of the advantageous features of the invention is that the compounds may be produced from readily available substances by simple, practical, and economical manufacturing process. Another important feature of the compounds of the invention is that they are readily soluble in the petroleum distillates commonly used as solvents in insecticidal sprays.

The new compounds which I have discovered are nitrogen substituted amides of certain new sulfide sulfur containing carboxylic acids. These compounds are represented by the formula:

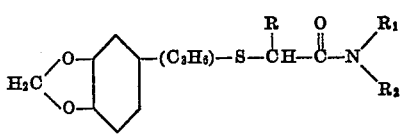

where R is hydrogen, methyl or ethyl, and $R_1$ and $R_2$ may each be a member of the group consisting of an alkyl radical, an alkenyl radical, a cycloalkyl radical and an aralykyl radical, also, $R_1$ may be hydrogen, also $R_1$ and $R_2$ together may be a single divalent aliphatic hydrocarbon radical, such as in the type of amides known as piperidides, or a single similar divalent aliphatic radical which is interrupted by ethereal oxygen, such as in the type of amides known as morpholides.

The acids, of which the nitrogen substituted amides are insecticidal compounds, may be made by the peroxide catalyzed addition reaction of an aliphatic α-mercapto carboxylic acid, of the formula

where R is as above, and a 3, 4-methylenedioxyphenyl-propylene, such as safrole or isosafrole. The acids subsequently may be reacted with an amine of the formula

where $R_1$ and $R_2$ are as above to produce the compounds. The compounds also may be made by the peroxide catalyzed addition reaction of an aliphatic α-mercapto nitrogen substituted amide of the formula

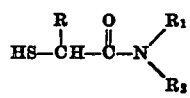

where R, $R_1$ and $R_2$ are as above, and a 3, 4-methylenedioxyphenyl-propylene, such as safrole or isosafrole.

The process used in making the compounds illustrating this invention is given below.

To a mixture consisting of 81 g. of safrole and 46 g. of mercaptoacetic acid, there was added a few drops of ascaridole, which is an organic peroxidic catalyst. The mixture was held at about 100° C. for 48 hours for the reaction to take place. The crude product was then neutralized with aqueous sodium hydroxide and any water-insoluble oil was removed. On acidifying with HCl, the new compound was precipitated in solid form. The yield was 110 g. The new compound may be further purified by recrystallization from a mixture of ethyl ether and low boiling petroleum ether. This new compound, hereinafter referred to as acid I, has the probable formula:

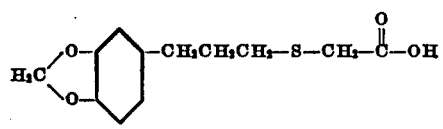

and its melting point is 71° C. Its neutral equivalent was found to be 252.5, which agrees closely with the theoretical value of 254.3.

A mixture consisting of 81 g. of isosafrole and 46 g. mercaptoacetic acid with a few drops of added ascaridole was subjected to the same treatment as was used in the preceding synthesis. The yield of the new compound, which is a viscous oily liquid, was 95 g. This new compound, hereinafter referred to as acid II, has the probable formula:

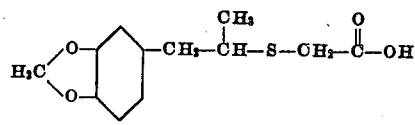

and its distillation range is 208° to 212° C. at 2 mm. of mercury pressure. Its neutral equivalent was found to be 260, which agrees closely with the theoretical value of 254.3.

Acids I and II were converted into the various nitrogen substituted amides by making the intermediary acid chlorides and reacting a portion of each of the acid chlorides with an excess of one of several amines. This is a standard well known method of converting carboxylic acids to nitrogen substituted amides. In practice, any other suitable method can be used. The melting points of those amides which are solids are given with the data in Tables I and II. The other amides were very viscous oily liquids. The liquid amides of this invention, with the exception of the morpholides, were soluble in Deo-Base, a purified petroleum distillate, the N,N-dibutylamides and the N,N-diamylamides being very soluble in this solvent. Solubility in such petroleum distillates is a very desirable property of insecticidal compounds.

Similar compounds may be made by starting with α-mercaptopropionic acid or α-mercaptobutyric acid in place of mercaptoacetic acid.

Spray solutions containing the compounds illustrating this invention were tested against houseflies by the large group Peet-Grady method as outlined in "Blue Book," page 177 (MacNair-Dorland Co., New York, 1939). Control tests with the Official Test Insecticide (OTI), which contains approximately 0.1 g. pyrethrins per 100 ml. (Soap and Sanitary Chemicals 21 (6): 137-141, June, 1945) were also performed with each batch of flies used. The solid amides and the morpholides were dissolved in a mixed solvent consisting of Deo-Base and not more than 10 per cent acetone, and the other liquid amides were dissolved in Deo-Base alone. Some of the compounds were tested without admixed pyrethrins. One or more solutions of each compound with admixed pyrethrins was tested. The amount of admixed pyrethrins was usually 0.025 g. per 100 ml. and this amount of pyrethrins alone gave, on testing, a 10 minute knockdown of only 84 per cent and a 24 hour kill of only 21 per cent when the 24 hour kill of the OTI was 50 per cent.

The results of the tests on the amides derived from acid I are given in Table I and the results of the tests on the amides derived from acid II are given in Table II. The compounds even without admixed pyrethrins show considerable paralyzing and killing ability. For fly sprays it is more practical to use the compounds in admixture with a minimum amount of pyrethrins, with which they exhibit synergistic action both in respect to the kill and in respect to the knockdown. Synergism in respect to kill is obvious from the data given for several of the compounds. Definite examples of synergism in regard to knockdown is provided by the data given for compounds 5 and 10. Thus a spray solution containing in admixture 0.1 g. of compound 5 and 0.0125 g. pyrethrins per 100 ml. gave a very satisfactory knockdown of 99 per cent, while neither twice this concentration, namely, 0.2 g. of the compound per 100 ml., alone, nor twice this concentration, namely, 0.025 g. of pyrethrins per 100 ml., alone, ever gave a knockdown of over 90 per cent. A similar situation is true in regard to the data for compound 10.

A very useful application of the ability of these compounds to greatly improve the knockdown when in admixture with 2,2-bis-p-chlorophenyl-1,1,1-trichloroethane (DDT) and a minimum amount of pyrethrins is illustrated herein. DDT is an excellent insect killer but it gives a very slow knockdown and pyrethrins are commonly admixed with it to impart rapid knockdown ability to the mixture. It is shown in the data for compounds 5 and 10 in Table I, that by halving that amount of the expensive pyrethrins, which in admixture with DDT gives an inadequate 10 minute knockdown, and adding a small amount of a compound of this invention, a satisfactory 10 minute knockdown and also a higher kill is obtained.

Some of the compounds which were tested against houseflies were also tested against certain agricultural insects. For these tests a weighed amount of a compound dissolved in 10 ml. of acetone was mixed with 90 ml. of a 0.1 per cent aqueous solution of sodium lauryl sulfate and the resulting emulsion sprayed upon insect infested leaves. After holding the sprayed insect infested leaves in Petri dishes for 20 hours the results were determined.

When thus tested against *Aphis rumicis* on nasturtium leaves, kills of 99 per cent were obtained with 0.1 per cent emulsions of compounds 5 and 13.

When thus tested against pea aphids on bush bean leaves, a kill of 100 per cent was obtained with a 0.1 per cent emulsion of compound 5.

When thus tested against a thrips species on chicory leaves, a kill of 100 per cent was obtained with a 0.1 per cent emulsion of compound 5.

When thus tested against red spider mites on bush bean leaves, a kill of 49 per cent was obtained with a 0.1 per cent emulsion of compound 13.

When similar tests were performed on Mexican bean beetle larvae on bush bean leaves with 0.2 per cent emulsions of compounds 10 and 21, a few of the larvae were killed, but it was significant that no feeding occurred within the 48 hour test period. Thus it is apparent that the compounds exhibit a repellant action against this insect.

In none of the above tests on agricultural insects did the control spray, which contained only water, acetone, and the emulsifying agent, give a kill of over 8 per cent.

It is to be understood that the compounds of Tables I and II are used merely as examples and the invention is not limited to these particular compounds. Also, the invention is not to be construed as limited to compounds made by means of that particular chemical reaction which was used for the making of the illustrative compounds. Also, the above examples are not to be construed as limiting either the method of application of these novel insecticides or the kinds of insects to which they may be applied.

Table I

| Compound No. | Compound which is derived from Acid I, and which is the— | Melting Point, °C. | Compound, g./100 ml. | Pyrethrins, g./100 ml. | 10 min. Knockdown, per cent | 24 Hr. Kill, per cent | 24 Hr. OTI Kill,[1] per cent | Increase over the OTI kill, per cent |
|---|---|---|---|---|---|---|---|---|
|  |  |  | 0 | .025 | 83 | 21 | 50 | −29 |
|  |  |  | 0 | .05 | 93 | 32 | 50 | −18 |
| 1 | N-Ethylamide | 61 | .4 | .025 | 96 | 58 | 51 | +7 |
| 2 | N-n-Butylamide | 50 | .4 | 0 | 72 | 67 | 64 | +3 |
|  |  |  | .2 | .025 | 96 | 55 | 50 | +5 |
| 3 | N-iso-Butylamide | 47 | .4 | 0 | 90 | 56 | 40 | +16 |
|  |  |  | .2 | .025 | 98 | 77 | 54 | +23 |
| 4 | N-Allylamide | 74 | .4 | .025 | 97 | 53 | 51 | +2 |
| 5 | N-Cyclohexylamide | 85 | .4 | 0 | 92 | 52 | 39 | +13 |
|  |  |  | .4 | .025 | 99 | 94 | 39 | +55 |
|  |  |  | .1 | .025 | 98 | 63 | 44 | +19 |
|  |  |  | .05 | .025 | 97 | 51 | 53 | −2 |
|  |  |  | .1 | .0125 | 99 | 45 | 46 | −1 |
|  |  |  | 0 | .025 plus 0.1 g. DDT per 100 ml. | 86 | 74 | 46 | +28 |
|  |  |  | .1 | .0125 plus 0.1 g. DDT per 100 ml. | 97 | 93 | 46 | +47 |
| 6 | N-Benzylamide | 82 | .4 | .025 | 96 | 48 | 51 | −3 |
| 7 | N,N-Di-ethylamide |  | .2 | .025 | 95 | 75 | 50 | +25 |
| 8 | N,N-Di-n-propylamide |  | .2 | .025 | 99 | 71 | 43 | +28 |
| 9 | N,N-Di-iso-propylamide |  | .2 | .025 | 99 | 66 | 43 | +23 |
| 10 | N,N-Di-n-Butylamide |  | .4 | 0 | 76 | 57 | 51 | +6 |
|  |  |  | .4 | .025 | 99 | 92 | 51 | +41 |
|  |  |  | .2 | .025 | 98 | 81 | 51 | +30 |
|  |  |  | .1 | .025 | 96 | 65 | 49 | +16 |
|  |  |  | .05 | .025 | 99 | 45 | 40 | +5 |
|  |  |  | .1 | .0125 | 99 | 45 | 46 | −1 |
|  |  |  | 0 | .025 plus 0.1 g. DDT per 100 ml. | 86 | 74 | 46 | +28 |
|  |  |  | .1 | .0125 plus 0.1 g. DDT per 100 ml. | 97 | 90 | 46 | +44 |
| 11 | N,N-Di-amylamide |  | .1 | .025 | 96 | 60 | 43 | +17 |
| 12 | N,N-Dicyclohexylamide |  | .4 | .025 | 98 | 72 | 58 | +14 |
| 13 | Piperidide |  | .8 | 0 | 87 | 80 | 53 | +27 |
|  |  |  | .4 | 0 | 81 | 59 | 50 | +9 |
|  |  |  | .2 | .025 | 100 | 85 | 52 | +33 |
| 14 | Morpholide |  | .2 | .025 | 93 | 53 | 50 | +3 |

[1] The 10 minute knockdown of the OTI was within the range of 95 to 100 per cent in all cases.

Table II

| Compound No. | Compound which is derived from Acid II, and which is the— | Melting Point, °C. | Compound, g./100 ml. | Pyrethrins, g./100 ml. | 10 min. Knockdown, per cent | 24 Hr. Kill, per cent | 24 Hr. OTI Kill,[1] per cent | Increase over the OTI kill, per cent |
|---|---|---|---|---|---|---|---|---|
| 15 | N-n-Butylamide | 62 | .2 | .025 | 99 | 86 | 57 | +29 |
|  | N-iso-Butylamide | 74 | .2 | .025 | 96 | 73 | 57 | +16 |
| 16 | N-Cyclohexylamide | 100 | .4 | 0 | 88 | 38 | 39 | −1 |
|  |  |  | .4 | .025 | 99 | 94 | 39 | +55 |
|  |  |  | .2 | .025 | 99 | 83 | 39 | +44 |
|  |  |  | .1 | .025 | 99 | 80 | 53 | +27 |
|  |  |  | .05 | .025 | 97 | 51 | 53 | −2 |
| 17 | N-Benzylamide | 85 | .4 | 0 | 76 | 23 | 35 | −12 |
|  |  |  | .2 | .025 | 96 | 65 | 35 | +30 |
| 18 | N,N-Di-ethylamide |  | .2 | .025 | 95 | 59 | 51 | +8 |
| 19 | N,N-Di-n-propylamide |  | .2 | .025 | 97 | 79 | 57 | +22 |
| 20 | N,N-Di-iso-propylamide |  | .2 | .025 | 93 | 70 | 55 | +15 |
| 21 | N,N-Di-n-butylamide |  | .4 | 0 | 65 | 40 | 55 | −15 |
|  |  |  | .2 | .025 | 97 | 65 | 55 | +10 |
| 22 | N,N-Di-amylamide |  | .2 | .025 | 91 | 64 | 55 | +9 |
| 23 | Piperidide |  | .8 | 0 | 88 | 87 | 53 | +34 |
|  |  |  | .2 | .025 | 99 | 87 | 52 | +35 |
| 24 | Morpholide |  | .2 | .025 | 96 | 51 | 52 | −1 |

[1] The 10 minute knockdown of the OTI was within the range of 95 to 100 per cent in all cases.

I claim:
1. A compound represented by the formula:

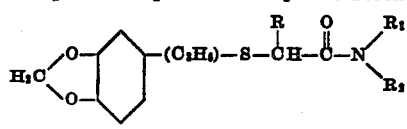

where R is a member of the group consisting of hydrogen, methyl, and ethyl; $R_1$ and $R_2$ taken together comprise at least one member of the group consisting of hydrogen, alkyl, alkenyl, cycloalkyl, divalent polymethylene and divalent polymethylene interrupted by ethereal oxygen; not more than one of the $R_1$ and $R_2$ groups being hydrogen.

2. A compound having the formula:

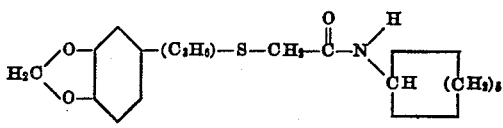

3. A compound having the formula:

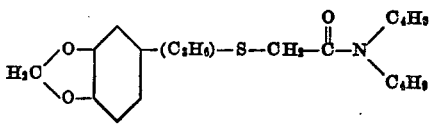

4. A compound having the formula:

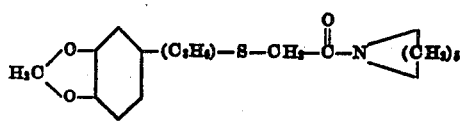

EDWARD A. PRILL.

REFERENCES CITED

The following references are of record in the file of this patent:

UNITED STATES PATENTS

| Number | Name | Date |
|---|---|---|
| 2,326,350 | Gertler et al. | Aug. 10, 1943 |
| 2,362,128 | Gertler et al. | Nov. 7, 1944 |

OTHER REFERENCES

Soap and Sanitary Chemicals, June 1943, by Roarck, pages 95 and 96.

Contributions Boyce Thompson Institute, Jan. 1946, volume 14, pages 127-150, by Prill et al.